United States Patent
Shen

(10) Patent No.: US 7,424,354 B2
(45) Date of Patent: Sep. 9, 2008

(54) SUPPLEMENTAL RESTRAINT DEPLOYMENT METHOD USING DYNAMIC CRASH CLASSIFICATION

(75) Inventor: Junqiang Shen, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 674 days.

(21) Appl. No.: 10/958,815

(22) Filed: Oct. 5, 2004

(65) Prior Publication Data
US 2006/0074537 A1    Apr. 6, 2006

(51) Int. Cl.
*B60R 21/32*    (2006.01)
*B60R 31/16*    (2006.01)

(52) U.S. Cl. .................. 701/45; 180/282; 280/728.1; 280/735

(58) Field of Classification Search ........... 701/45–47, 701/300–302; 280/728.1, 734–735; 340/436; 307/9.1, 10.1; 180/282, 271
See application file for complete search history.

(56) References Cited

U.S. PATENT DOCUMENTS

| | | | | |
|---|---|---|---|---|
| 5,293,153 A | * | 3/1994 | Rochette et al. | 340/438 |
| 5,407,228 A | * | 4/1995 | Shibata et al. | 280/735 |
| 5,785,347 A | * | 7/1998 | Adolph et al. | 280/735 |
| 6,036,224 A | | 3/2000 | Wachter et al. | 280/735 |
| 6,327,527 B1 | * | 12/2001 | Imai et al. | 701/45 |
| 6,701,238 B2 | | 3/2004 | McConnell | 701/45 |

* cited by examiner

*Primary Examiner*—Yonel Beaulieu
(74) *Attorney, Agent, or Firm*—Jimmy L. Funke

(57) ABSTRACT

A deployment method for a supplemental restraint system having multiple distributed acceleration sensors dynamically classifies each crash event based on relationships among the acceleration signals. A severity threshold is selected based on the instant crash classification, and a measure of crash severity is compared to the selected severity threshold to determine if the restraints should be deployed. The measure of crash severity is determined by computing individual measures of crash severity for the various frontal acceleration sensors and selecting the highest of the individual measures.

7 Claims, 4 Drawing Sheets

US 7,424,354 B2

SUPPLEMENTAL RESTRAINT DEPLOYMENT METHOD USING DYNAMIC CRASH CLASSIFICATION

TECHNICAL FIELD

The present invention relates to the deployment of vehicle supplemental restraints, and more particularly to a deployment method based on multiple distributed measures of vehicle acceleration and dynamic classification of a crash event.

BACKGROUND OF THE INVENTION

Frontal crash sensing in a vehicle supplemental restraint system can be based on multiple distributed measures of vehicle acceleration. For example, a system may include a central accelerometer located in a central region of the vehicle and one or more remote accelerometers located in a frontal region of the vehicle. The various acceleration signals can be independently processed during a crash event to determine if the crash is sufficiently severe to warrant deployment, and differences among the acceleration signals can be used to characterize the crash event or to judge the extent of intrusion. However, not all vehicles are equipped with the same set of acceleration sensors, and the relationship among the various acceleration signals can change in the course of a complex crash event. What is needed, therefore, is a configurable and easily implemented deployment method that makes coordinated usage of the available acceleration data.

SUMMARY OF THE PRESENT INVENTION

The present invention is directed to an improved deployment method for a supplemental restraint system including multiple distributed acceleration sensors, where a crash event is dynamically classified based on relationships among the acceleration signals, a severity threshold is selected based on the current crash classification, and a measure of crash severity is compared to the selected severity threshold to determine if the restraints should be deployed. The measure of crash severity is determined by computing individual measures of crash severity for the various frontal acceleration sensors and selecting the highest of the individual measures.

BRIEF DESCRIPTION OF THE DRAWINGS

FIG. 2 depicts multiple acceleration sensors and comparison of acceleration-related signals, and FIG. 3 depicts logic for dynamically classifying a crash event and selecting corresponding severity thresholds.

DESCRIPTION OF THE PREFERRED EMBODIMENT

Figure 1:
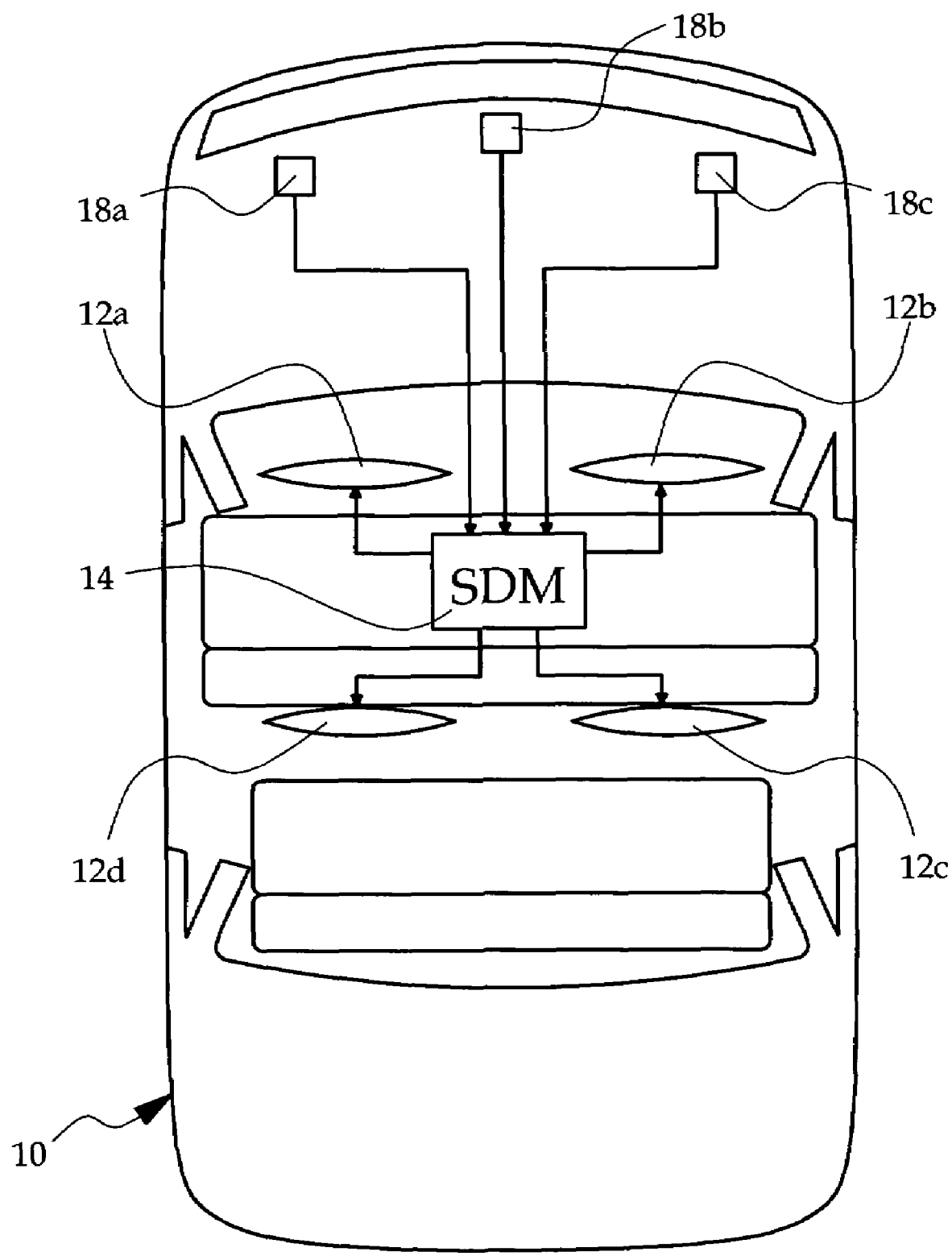
FIG. 1 is a schematic diagram of a supplemental restraint system including a sensing and diagnostic module (SDM) for carrying out the deployment method of this invention.

FIG. 1 generally depicts a supplemental restraint system installed in a vehicle 10. The restraint system includes a number of frontal restraints 12a, 12b, 12c, 12d such as air bags that are variously deployed in a severe crash event to protect the vehicle occupants. The restraints may include without limitation, air bags, belt pretensioners, inflatable tubular structures, side curtains, anti-whiplash devices, etc., and it will be understood that the term airbag as used herein does not refer exclusively to a particular type of restraint. A sensing and diagnostic module (SDM), designated generally by the reference numeral 14, is mounted on a frame element in a central portion of the vehicle 10. In the illustrated embodiment, the restraint system includes lateral and longitudinal acceleration sensors 14a, 14b within the SDM 14 and a set of three electronic frontal acceleration sensors 18a, 18b, 18c. The SDM 14 additionally includes a programmed microprocessor for receiving the output signals of the acceleration sensors and circuitry for deploying some or all of the restraints 12a-12d in the event of a severe crash.

Figure 2:
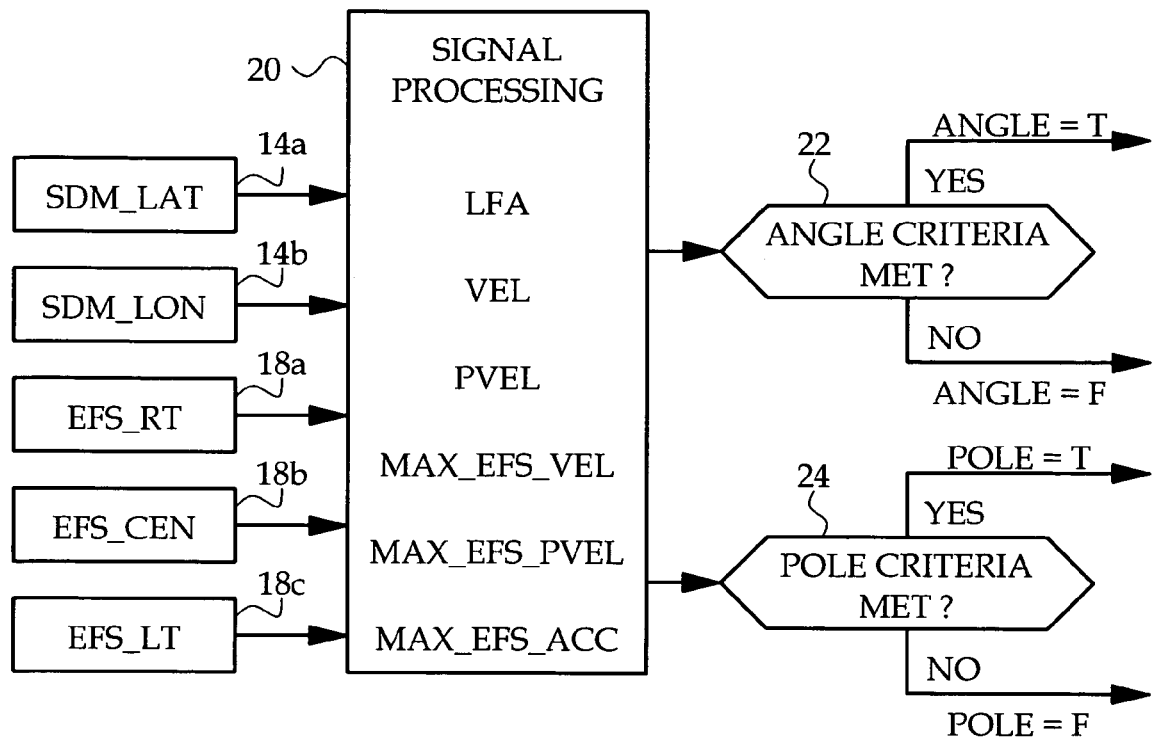
FIGS. 2-3 together depict a block diagram illustrating crash classification according to a preferred embodiment of this invention.

The principle functions performed by SDM 14 include monitoring the acceleration signals to detect the onset of a crash event, and thereafter assessing the crash severity and issuing a deployment command for some or all of the restraints 12a-12d if both crash severity and immunity conditions are satisfied. The block diagram of FIG. 2 illustrates this functionality for a frontal crash event. The inputs include the acceleration signal outputs of the SDM's lateral and longitudinal acceleration sensors 14a, 14b and the three electronic frontal sensors 18a, 18b, 18c. The acceleration sensors will typically include discrete low pass filter elements to limit the frequency content of the respective acceleration signals, although such signals are commonly referred to as raw acceleration signals. The raw acceleration signals are applied to a signal processing block 20 that develops various parameters used for purposes of crash classification, crash severity judgment and deployment immunity testing. In the illustrated embodiment, these parameters include a low-frequency acceleration value (LFA), a velocity value (VEL) and a peak velocity value (PVEL) for each of the acceleration signals. Additionally, the signal processing block 20 develops a set of maximum frontal parameters (MAX_EFS_LFA, MAX_EFS_VEL, MAX_EFS_PVEL) representing, at any given time, the highest of the parameters developed from the electronic frontal sensor signals. That is, MAX_EFS_LFA is the highest low-frequency acceleration value produced by the frontal sensors 18a-18c; MAX_EFS_VEL is the highest velocity value determined from the frontal sensors 18a-18c; and MAX_EFS_PVEL is the highest peak velocity value determined from the frontal sensors 18a-18c.

The LFA values are determined by low-pass filtering the respective acceleration signals, and the VEL values are determined by sampling and integrating the respective acceleration signals using a computation such as:

$$VEL(I) = V(I-1) + A(I) - C$$

where VEL(I) is the new value of VEL, VEL(I-1) is the previous value of VEL, A(I) is the current sample of the respective raw acceleration and C is a decay constant that compensates for sensor drift. The PVEL values are determined by identifying and saving the highest VEL value computed for each sensor during the course of a given crash event.

The blocks 22 and 24 detect predetermined relationships among various parameters produced by block 20 for the purpose of dynamically classifying the crash event. In the illustrated embodiment, four possible categories are defined by the outcomes of two questions: (1) is this an angle impact, and (2) is this a pole impact. The block 22 determines the outcome of the first question, and block 24 determines the outcome of the second question.

The presence of an angle impact may be determined either by comparing the lateral and longitudinal velocities associated with the SDM acceleration sensors 14a and 14b, or by comparing the velocities associated with the left and right electronic frontal acceleration sensors 18a and 18c. If the SDM velocities are used, the block 22 computes the ratio of the lateral velocity SDM_LAT_VEL to the longitudinal velocity SDM_LON_VEL, and compares the absolute value of that ratio with a calibrated threshold. An angle impact produces a relatively large ratio value, resulting in the outcome "ANGLE=TRUE"; whereas a head-on impact produces a relatively small ratio value, resulting in the outcome "ANGLE=FALSE". If the frontal velocities are used, the block 22 computes a difference between the left velocity EFS_LT_VEL and the rights velocity EFS_RT_VEL, and compares the absolute value of the difference with a calibrated threshold. An angle impact produces a relatively large difference, resulting in the outcome "ANGLE=TRUE"; whereas a head-on impact produces a relatively small difference, resulting in the outcome "ANGLE=FALSE".

The presence of a pole impact may be determined by comparing the velocities associated with the SDM.'s longitudinal acceleration sensor 14b and the frontal sensors 18a-18c, either using a difference or a ratio. If a difference is used, the block 24 computes a difference between the SDM velocity SDM_LON_VEL and MAX_EFS_VEL, and compares the absolute value of the difference with a calibrated threshold. A pole impact produces a relatively large difference, resulting in the outcome "POLE=TRUE"; whereas a non-pole impact produces a relatively small difference, resulting in the outcome "POLE=FALSE". If a ratio is used, the block 24 computes the ratio of SDM_LON_VEL to MAX_EFS_VEL, and compares the absolute value of that ratio with a calibrated threshold. A pole impact produces a relatively small ratio value, resulting in the outcome "POLE=TRUE"; whereas a non-pole impact produces a higher ratio value, resulting in the outcome "POLE=FALSE".

Figure 3:
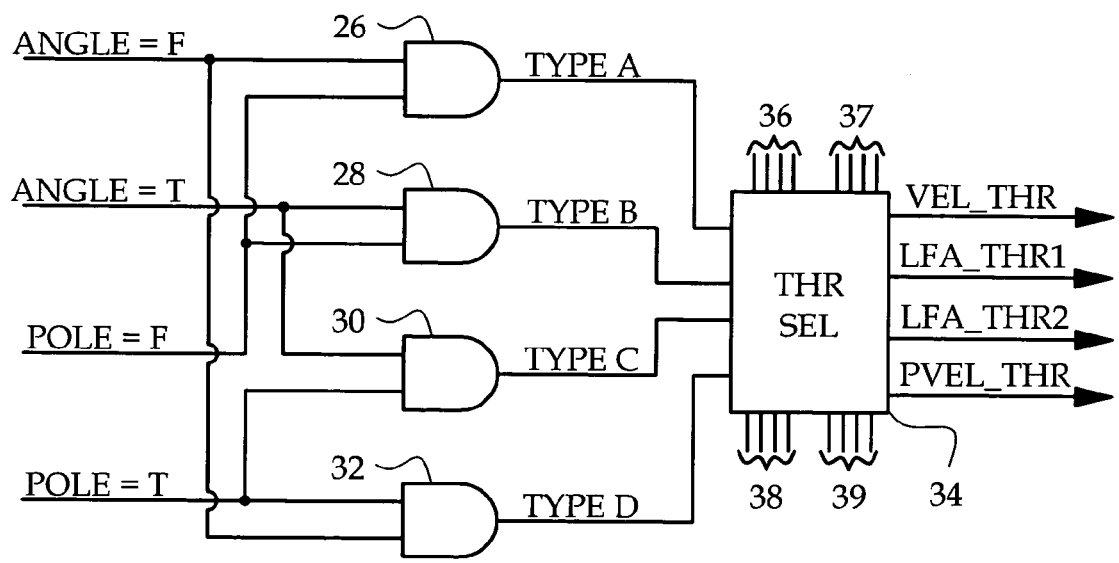

The block diagram of FIG. 3 illustrates a logic circuit comprising the four AND-gates 26, 28, 30, 32 for combining of the outcomes produced by the block diagram of FIG. 2. This results in one of four crash classifications, identified in FIG. 3 as TYPE_A, TYPE_B, TYPE_C and TYPE_D. The TYPE_A crash is indicated by a logic-one output of AND-gate 26 when both ANGLE and POLE are false; the TYPE_B crash is indicated by a logic-one output of AND-gate 28 when ANGLE is true and POLE is false; the TYPE_C crash is indicated by a logic-one output of AND-gate 30 when both ANGLE and POLE is true; and the TYPE_D crash is indicated by a logic-one output of AND-gate 32 when ANGLE is false and POLE is true. The AND-gate outputs are applied to select-inputs of the block 34. Also applied to block 34 are four different sets 36, 37, 38, 39 of calibrated crash severity thresholds corresponding to the thresholds VEL_THR, LFA_THR1, LFA_THR2 and PVEL_THR referred to in the respective decision blocks 40, 42, 44, 46 of FIG. 4, discussed below. As indicated in FIG. 3, each threshold set 36, 37, 38, 39 includes four possible levels of the respective threshold, one level for each of the four possible crash classifications. The block 34 selects the calibrated thresholds for the identified crash classification, and produces them as the outputs VEL_THR, LFA_THR1, LFA_THR2 and PVEL_THR. Of course, it should be understood that the block 34 may store additional calibrated thresholds, such as thresholds for deploying successive stages of the restraints 12a-12d, or different threshold levels depending on whether or not the occupants are wearing seat belts, or different types of crash severity thresholds, and so on.

Figure 4:
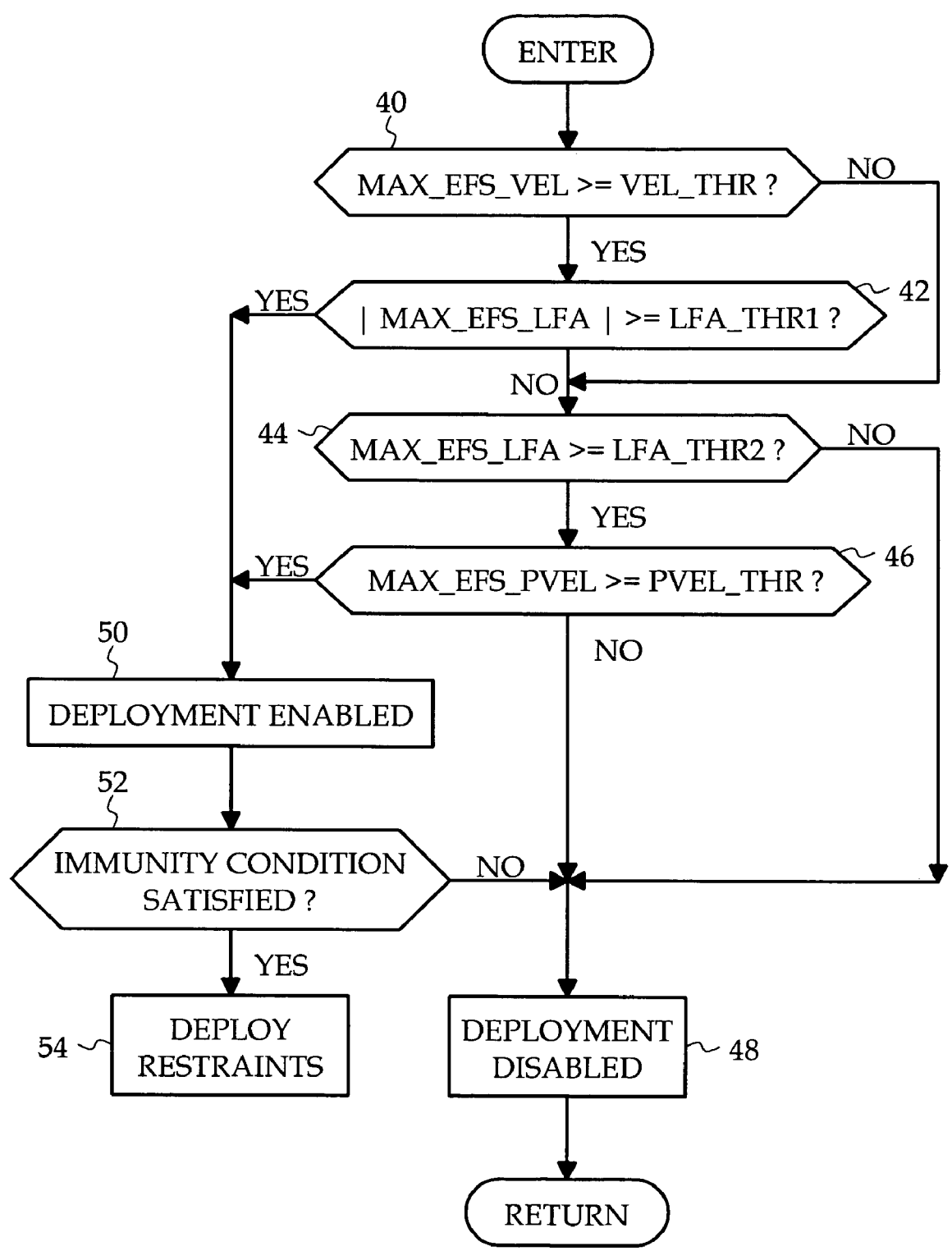
FIG. 4 is a flow diagram depicting a software routine carried out by the SDM of FIG. 1 for determining if supplemental restraints should be deployed.

The flow diagram of FIG. 4 represents a software routine periodically executed by the microprocessor of SDM 14 in the course of a crash event for determining if some or all of the restraints 12a-12d should be deployed. The blocks 40-42 and 44-46 respectively define first and second possible conditions for enabling deployment. The first condition occurs if MAX_EFS_VEL equals or exceeds the velocity threshold VEL_THR selected by block 34 of FIG. 3, and the absolute value of MAX_EFS_LFA equals or exceeds the low frequency acceleration threshold LFA_THR1 selected by block 34 of FIG. 3. Under the first condition, blocks 40 and 42 are both answered in the affirmative; if either block is answered in the negative, the blocks 44-46 are executed to check for the second condition. The second condition occurs if MAX_EFS_LFA equals or exceeds the low frequency acceleration threshold LFA_THR2 selected by block 34 of FIG. 3, and MAX_EFS_PVEL equals or exceeds the peak velocity threshold PVEL_THR selected by block 34 of FIG. 3. Under the second condition, blocks 44 and 46 are both answered in the affirmative; if either block is answered in the negative, neither of the first and second conditions are present, and the block 48 is executed to disable restraint deployment. If the first or second conditions are detected, the block 50 enables restraint deployment and the block 52 determines if one or more specified immunity conditions are also satisfied. If the immunity condition is not satisfied, the block 48 is executed to disable restraint deployment; if the immunity condition is satisfied, the block 54 is executed to deploy the restraints 12a-12d. Immunity conditions may vary, but typically require the attainment of at least a minimum velocity value for the SDM's longitudinal acceleration sensor 14b. For example, the immunity condition of block 52 can be configured to require that the VEL value associated with sensor 14b exceed a calibrated threshold within a predetermined interval following the execution of block 50.

Figure 5:
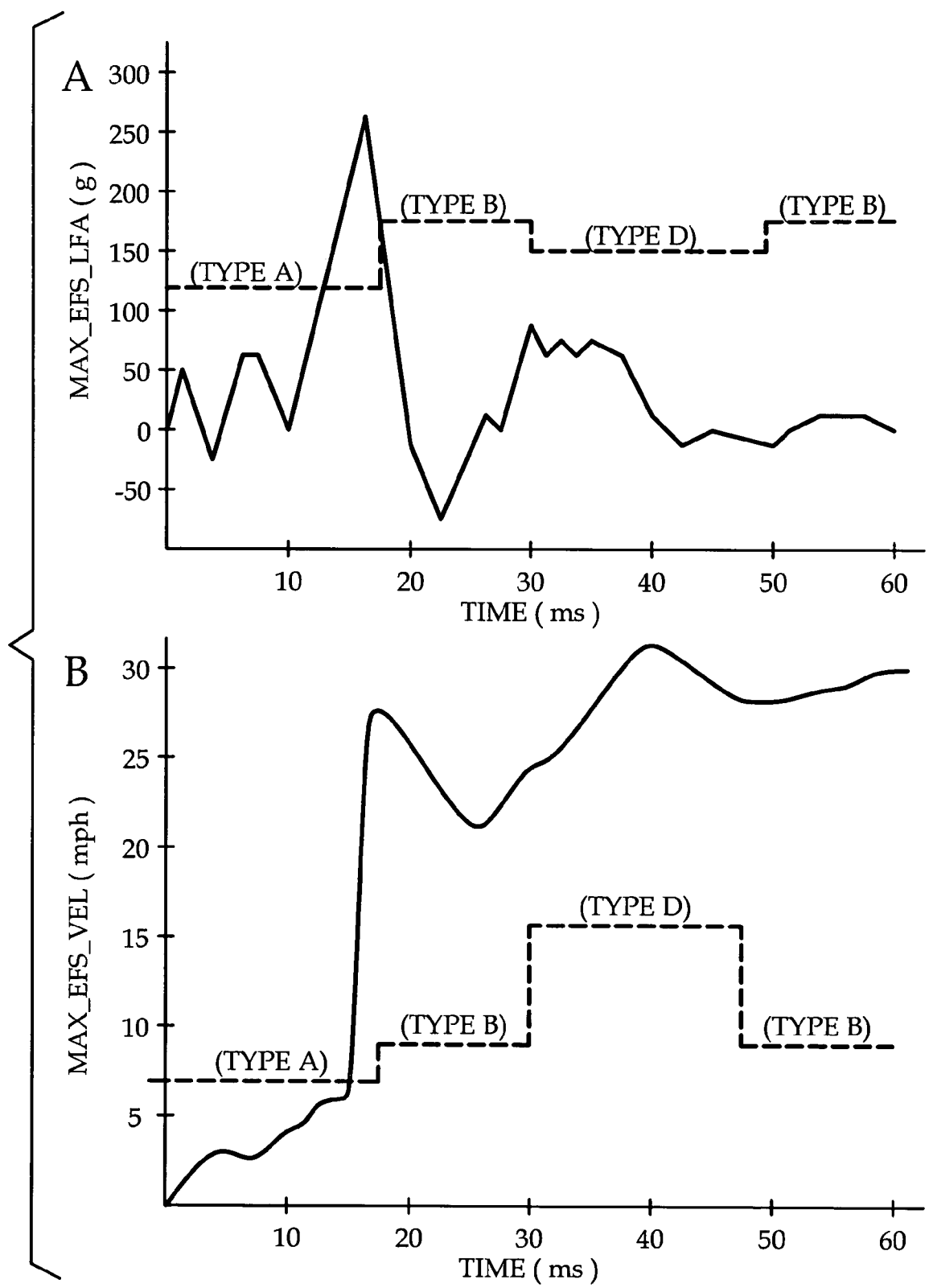
FIG. 5, Graphs A-B, depict the application of the method of this invention to a crash event. Graph A depicts a low frequency acceleration signal and a dynamic multi-level acceleration threshold according to this invention, and Graph B depicts a velocity signal and a dynamic multi-level velocity threshold according to this invention.

Experience has shown that real-world crash events are varied and complex in nature. As a result, the crash classification produced by the logic of FIGS. 2-3 will in all probability change one or more times during the course of a single crash event. In other words, the logic of FIGS. 2-3 is configured to dynamically classify the crash event. This produces a crash severity thresholds VEL_THR, LFA_THR that are subject to dynamic and time-independent variation in the course of a single crash event, as illustrated by FIG. 5 which depicts data from a frontal crash event. Referring to FIG. 5, Graph A depicts MAX_EFS_LFA, and Graph B depicts MAX_EFS_VEL, on a common time scale. The selected acceleration threshold LFA_THR is depicted by the dashed line in Graph A, and the selected velocity threshold VEL_THR is depicted by the dashed line in Graph B. The crash is consecutively classified as a TYPE_A crash (in the interval of 0-18 msec), a TYPE_B crash (in the interval of 18-30 msec), a TYPE_D crash (in the interval of 30-48 msec), and a TYPE_B crash (from 48 msec forward). At each change in crash classification, the block 34 of FIG. 3 correspondingly changes the acceleration and velocity thresholds LFA_THR and VEL_THR. The level changes of each threshold are not determined in advance, but rather depend on the acceleration data measured in any given crash event. In the example of FIG. 5, deployment of the restraints is enabled approximately 12 msec after the onset of the crash event, due to MAX_EFS_VEL crossing VEL_THR. Calibration of the threshold levels for any crash data set is carried out by allowing the logic of FIGS. 2-3 to dynamically classify the crash event, and then separately setting the LFA_THR and VEL_THR levels for each of the identified crash types, relative to the acceleration and velocity crash data during that segment of the crash event.

In summary, the present invention provides an easily calibrated and deployment method for a restraint system having multiple distributed acceleration sensors. The method involves dynamically classifying the crash event based on relationships among the acceleration signals, and selecting one or more severity thresholds based on the current crash classification. This results in multi-level, time-independent severity thresholds that are both easily calibrated and uniquely tailored to each crash event.

While the method of the present invention has been described with respect to the illustrated embodiment, it is recognized that numerous modifications and variations in addition to those mentioned herein will occur to those skilled in the art. For example, the crash event may be classified differently than described herein, the method may be applied to side impacts, and to systems having more or fewer frontal crash sensors than illustrated. Also, crash severity may be judged by factors instead of or in addition to those described, and so on. Accordingly, it is intended that the invention not be limited to the disclosed embodiment, but that it have the full scope permitted by the language of the following claims.

The invention claimed is:

1. A method of deploying a supplemental restraint based on multiple distributed measures of vehicle acceleration, the method comprising the steps of:
    defining a plurality of crash types characterized by different relationships among the distributed measures of vehicle acceleration;
    establishing calibrated severity thresholds for each of said crash types;
    developing a measure of crash severity from the measures of vehicle acceleration; and
    enabling deployment of said restraint when the measure of crash severity exceeds the selected severity threshold;
    said method further comprising, for a crash event:
    determining a first crash type based upon the distributed measures of vehicle acceleration and the definitions of crash type,
    setting a first severity threshold based upon the first crash type;
    continuously monitoring said measures of acceleration during the course of the crash event, and
    dynamically reclassifying the crash event to a second crash type based upon changes in the distributed measures; and
    setting a second severity threshold based upon the second crash type.

2. The method of claim 1, including the steps of:
    detecting an immunity condition; and
    allowing deployment of said restraint if said immunity condition is satisfied within a predetermined period of time after said measure of crash severity exceeds the selected severity threshold.

3. The method of claim 1, including the step of:
    developing velocity values from the distributed measures of vehicle acceleration;
    defining the plurality of crash types based on different relationships among velocity values for the distributed measures of vehicle acceleration; and
    dynamically classifying the crash event into one of said plurality of crash types based on the developed velocity values.

4. The method of claim 3, where the multiple distributed measures of acceleration include two or more measures of acceleration in a frontal portion of the vehicle, the method including the steps of:
    developing frontal velocity values from the measures of acceleration in the frontal portion of the vehicle;
    identifying the highest of the developed frontal velocity values; and
    dynamically classifying the crash event based in part on the identified frontal velocity value.

5. The method of claim 3, where the multiple distributed measures of acceleration include a measure of acceleration in a central portion of the vehicle, and the step of dynamically classifying the crash event includes the steps of:
    developing a central velocity value from the measure of acceleration in the central portion of the vehicle;
    computing a ratio of the central velocity value and the identified frontal velocity value; and
    dynamically classifying the crash event based in part on the computed ratio.

6. The method of claim 3, where the multiple distributed measures of acceleration include a measure of acceleration in a central portion of the vehicle, and the step of dynamically classifying the crash event includes the steps of:
    developing a central velocity value from the measure of acceleration in the central portion of the vehicle;
    computing a difference between the central velocity value and the identified frontal velocity value; and
    dynamically classifying the crash event based in part on the computed difference.

7. The method of claim 1, where the multiple distributed measures of acceleration include two or more measures of acceleration in a frontal portion of the vehicle, the method including the steps of:
    developing measures of frontal crash severity from the measures of acceleration in the frontal portion of the vehicle;
    identifying the highest of the developed measures of frontal crash severity; and
    enabling deployment of said restraint when the identified measure of frontal crash severity exceeds the selected severity threshold.

* * * * *